United States Patent
Rehle

(10) Patent No.: US 8,516,890 B2
(45) Date of Patent: Aug. 27, 2013

(54) ACCELERATION SENSOR HAVING SUBSTRATE, WEB, AND SEISMIC MASS

(75) Inventor: Dirk Rehle, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 12/680,715

(22) PCT Filed: Sep. 24, 2008

(86) PCT No.: PCT/EP2008/062765
§ 371 (c)(1),
(2), (4) Date: Mar. 29, 2010

(87) PCT Pub. No.: WO2009/047120
PCT Pub. Date: Apr. 16, 2009

(65) Prior Publication Data
US 2010/0212423 A1 Aug. 26, 2010

(30) Foreign Application Priority Data
Oct. 5, 2007 (DE) .................. 10 2007 047 592

(51) Int. Cl.
*G01P 15/125* (2006.01)
*G01P 15/08* (2006.01)

(52) U.S. Cl.
USPC ............ 73/514.32; 73/541.38; 73/514.35

(58) Field of Classification Search
USPC ............ 73/514.32, 514.36, 514.38, 514.29, 73/514.16, 514.35
See application file for complete search history.

(56) References Cited

U.S. PATENT DOCUMENTS

| | | | |
|---|---|---|---|
| 5,618,989 A * | 4/1997 | Marek | 73/1.38 |
| 5,635,640 A | 6/1997 | Geen | |
| 5,983,721 A * | 11/1999 | Sulzberger et al. | 73/514.32 |
| 6,070,464 A * | 6/2000 | Koury et al. | 73/514.32 |
| 6,230,567 B1 | 5/2001 | Greiff | |
| 6,393,913 B1 * | 5/2002 | Dyck et al. | 73/504.12 |
| 6,401,536 B1 * | 6/2002 | O'Brien | 73/514.38 |
| 6,845,670 B1 * | 1/2005 | McNeil et al. | 73/514.32 |
| 7,121,141 B2 * | 10/2006 | McNeil | 73/514.32 |
| 7,322,242 B2 * | 1/2008 | Merassi et al. | 73/514.38 |
| 7,520,171 B2 * | 4/2009 | Merassi et al. | 73/514.32 |
| 2005/0235751 A1* | 10/2005 | Zarabadi et al. | 73/514.01 |
| 2006/0032310 A1* | 2/2006 | Merassi et al. | 73/514.35 |
| 2009/0282914 A1* | 11/2009 | Rehle | 73/504.12 |
| 2009/0320596 A1* | 12/2009 | Classen et al. | 73/514.32 |

FOREIGN PATENT DOCUMENTS

| | | |
|---|---|---|
| DE | 195 00 800 | 12/1995 |
| DE | 195 23 895 | 1/1997 |
| DE | 195 39 946 | 4/1997 |
| DE | 196 39 946 | 4/1998 |
| DE | 10 2006 033 636 | 1/2008 |
| EP | 1 083 144 | 3/2001 |
| EP | 1 591 793 | 11/2005 |
| EP | 1 626 283 | 2/2006 |
| WO | 01/59465 | 8/2001 |

* cited by examiner

*Primary Examiner* — Helen Kwok
(74) *Attorney, Agent, or Firm* — Kenyon & Kenyon LLP

(57) ABSTRACT

An acceleration sensor having a substrate, at least one web, and a seismic mass, the web and the seismic mass being situated over a plane of the substrate. The seismic mass is situated on at least two sides of the web and elastically suspended on the web. The web is anchored on the substrate with the aid of at least one anchor. At least one anchor is situated outside the center of gravity of the seismic mass.

8 Claims, 4 Drawing Sheets

ACCELERATION SENSOR HAVING SUBSTRATE, WEB, AND SEISMIC MASS

FIELD OF THE INVENTION

The present invention is directed to an acceleration sensor having a substrate, at least one web, and a seismic mass, the web and the seismic mass being situated over a plane of the substrate. The seismic mass is situated on at least two sides of the web and is elastically suspended on the web. The web is anchored on the substrate with the aid of an anchor.

BACKGROUND INFORMATION

If the substrate is made of a different material than the at least one web, then mechanical stresses may occur between the substrate and the web or the seismic mass due to different thermal expansion coefficients. However, such stresses may also occur because the web and the seismic mass are already manufactured with inherent stresses. In addition, mechanical stresses in the substrate itself may be caused by the manufacturing process, by soldering or gluing or capping, for example. Since the web and the seismic mass are the clearly weaker elements compared to the substrate, these stresses are reduced by the fact that the web and the seismic mass deform, thereby changing the position of the seismic mass relative to the substrate and other fixed elements anchored on the substrate. For example, in the case of capacitively operating acceleration sensors a zero point error for the measured capacitance occurs due to a distance change of mobile electrodes to fixed electrodes.

German patent document DE 196 39 946 discusses a micromechanical acceleration sensor having a surface-micromechanical structure including two closely adjacent suspension points between which there is a movable seismic mass which is suspended at the two suspension points with the aid of suspension springs.

German patent document DE 19523895 A1 discusses a micromechanical yaw rate sensor having a surface-micromechanical structure including a central suspension (central suspension point) and a seismic mass situated around it which is suspended on the central suspension with the aid of suspension springs.

German patent document DE 19500800 A1 (FIGS. 5 & 6) discusses in FIGS. 5 and 6 a micromechanical sensor having a central suspension and two adjacent seismic masses facing one another which are connected to one another via connecting webs and suspended on the central suspension.

European Patent Application EP 1083144 A1 discusses a micromechanical device having a central suspension and two adjacent seismic masses facing one another which are connected to one another via connecting webs and suspended on the central suspension with the aid of a connecting web. The central suspension is situated in the center (on the central axis of the center of gravity or surface) of the entire movable structure.

European Patent Application EP 1626283 A discusses a micromechanical device having a central suspension and two adjacent seismic masses facing one another which are connected to one another via connecting webs and suspended on the central suspension with the aid of a connecting web. The central suspension is situated in the center (on the central axis) of the entire movable structure. Furthermore, a plurality of movable electrodes and additionally a plurality of fixed electrodes on the movable structure are disclosed.

The plurality of fixed electrodes has a shared suspension which is situated in proximity to the central suspension. Patent Application DE 10 2006 033 636 (not a prior publication) discusses a similar object.

SUMMARY OF THE INVENTION

The exemplary embodiments and/or exemplary methods of the present invention is based on the object of providing an acceleration sensor which is designed in such a way that a zero point error for the measured capacitance is avoided.

The exemplary embodiments and/or exemplary methods of the present invention is directed to an acceleration sensor having a substrate, at least one web and a seismic mass, the web and the seismic mass being situated over a plane of the substrate. The seismic mass is situated on at least two sides of the web and elastically suspended on the web. The web is anchored on the substrate with the aid of at least one anchor. An aspect of the exemplary embodiments and/or exemplary methods of the present invention is that the at least one anchor is situated outside the center of gravity of the seismic mass.

The at least one anchor is advantageously located in direct proximity to the center of gravity so that a deflection of the substrate and/or the seismic mass may influence the relative orientation of the web and the seismic mass with respect to the substrate as little as possible. In addition, acceleration sensors of this type may be designed for saving space on the substrate. An advantageous embodiment of the present invention provides that at least two anchors are provided. The at least two anchors are advantageously located in direct proximity to one another so that a deflection of the substrate may barely influence the relative orientation of the web with respect to the substrate. A particularly advantageous embodiment of the present invention provides that the center of gravity is situated between the two anchors. It is also advantageous that the seismic mass surrounds the web in the shape of a ring. An advantageous embodiment of the present invention provides that at least two webs are provided on which the seismic mass is elastically suspended.

In summary, one can say that anchoring the seismic mass at one point or in a relatively small area is advantageous. This point does not have to be in the center of gravity of the seismic mass. However, due to the load distribution, it is advantageous when the point lies in the proximity of the center of gravity. If multiple anchors are provided, then it is advantageous to place these anchors within a small area, i.e., relatively close together in relation to the dimension of the structure to be anchored. It is advantageous for the load distribution when the center of gravity is situated between the anchors. In the case of a capacitive acceleration sensor, movable electrodes are provided on the seismic mass and stationary electrodes facing each other are provided on the substrate. If a shared anchor of the stationary electrodes is provided, then it is advantageous for obtaining a zero point error as small as possible to provide this shared anchor in proximity to the anchor of the seismic mass.

DETAILED DESCRIPTION

Figure 1:
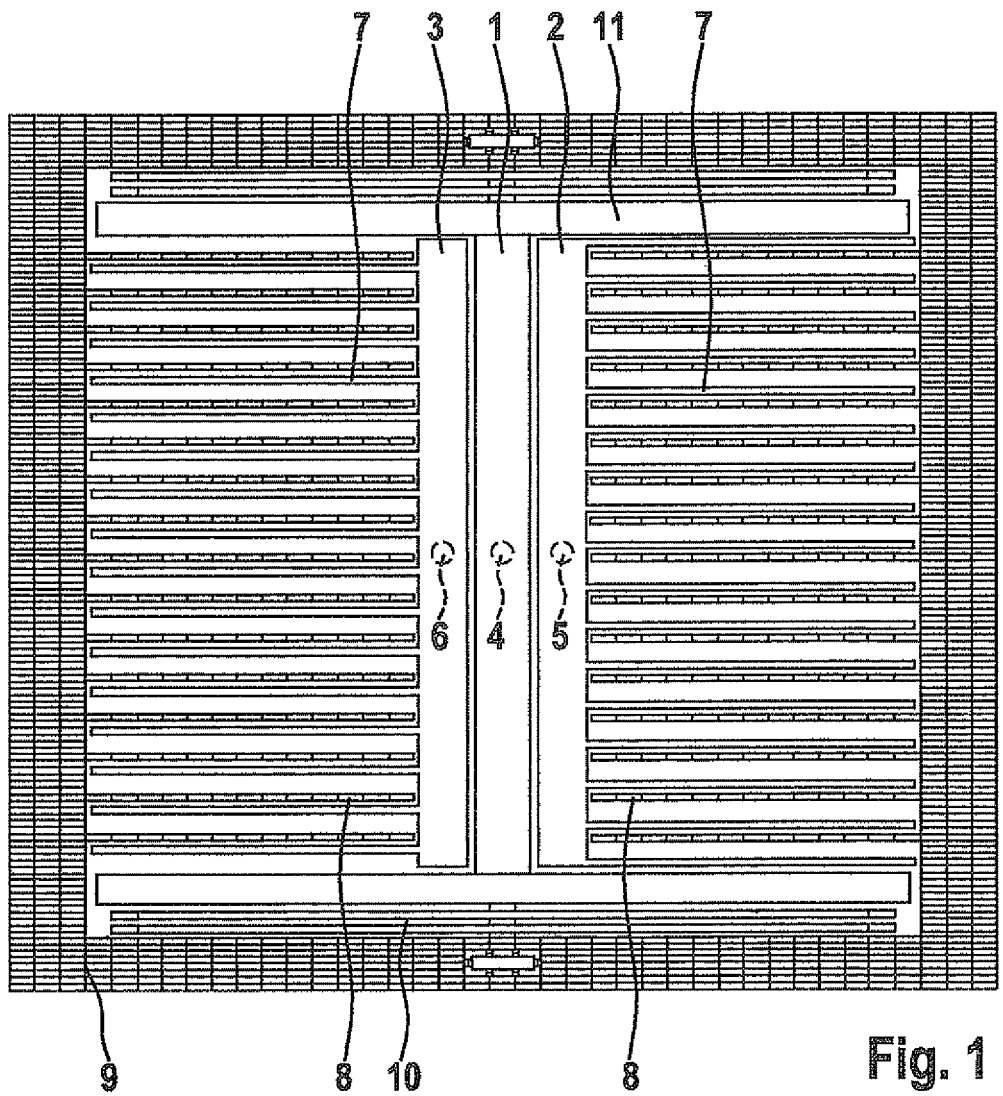
FIG. 1 shows an acceleration sensor having a central suspension from the related art.

FIG. 1 shows an acceleration sensor from the related art as it is described in Patent Application DE 10 2006 033 636 (not a prior publication). FIG. 1 shows an acceleration sensor which is manufactured, for example, by depositing a polysilicon layer on an oxide layer which in turn is provided on a silicon substrate. Recesses are formed in the oxide layer so that connections from the polysilicon layer to the silicon substrate are created in these recesses. The structures shown in FIG. 1 are subsequently defined and the oxide layer is removed in an etching process. The polysilicon layer remains connected to the silicon substrate.

The acceleration sensor includes a central web 1, a right web 2, and a left web 3, right web 2 and left web 3 running parallel to central web 1 on its right and left side. Central web 1, right web 2, and left web 3 are situated over a substrate, which runs in the paper's plane, and are each connected to a central anchoring area 4, a right anchoring area 5, and a left anchoring area 6. Anchors 4, 5, 6 including the substrate are located below webs 1, 2, 3 and are not visible from this perspective and are therefore depicted with dashed lines. Each of anchors 4, 5, 6 is located centrally, i.e., anchors 4, 5, 6 may lie close or even exactly below the centers of gravity of the respective webs 1, 2, 3 so that the forces acting on anchors 4, 5, 6 perpendicularly to the substrate due to an acceleration are minimized. In addition, it is sufficient to provide exactly one anchoring area for anchoring each web 1, 2, 3 on the substrate. Therefore, webs 1, 2, 3 do not have to deform to compensate for mechanical stresses relative to the substrate. Moreover, anchors 4, 5, 6 are located as close as possible to one another. Therefore, they lie on a line which intersects central web 1, right web 2, and left web 3.

Tines 7 of a right web electrode are formed on the right side of right web 2 which faces away from central web 1. Tines 7 of the right web electrode engage in tines 8 of a right seismic electrode. Tines 7 of a left web electrode are formed on the left side of left web 2 which faces away from central web 1. Tines 7 of the left web electrode engage in tines 8 of a left seismic electrode. Tines 8 of the left seismic electrode and the right seismic electrode are attached to a closed frame 9. Frame 9 and tines 8 of the seismic electrodes are perforated, i.e., they have a uniform arrangement of through holes. The perforation enables an etching medium to penetrate a layer below during the etching process so that frame 9 and tines 8 may be safely separated from the substrate. Tines 7 and webs 1, 2, 3 may also be perforated for the same reason.

Frame 9 is suspended on springs 10 on opposite ends of central web 1. Each spring 10 is made up of multiple thin webs which are situated parallel to one another. Two adjacent webs are connected at a distance either at their ends or in their center. Therefore, springs 10 may be easily deformed in the direction perpendicular to the parallel webs, but not in the parallel direction. Moreover, springs 10 are situated in such a way that the frame is slidable particularly along the three parallel webs 1, 2, 3. A cross web 11 is formed on both ends of web 1 which protects the fine tines 7, 8 of the seismic electrodes from an impact by deformed springs 10.

The pair made up of the left web electrode and the left seismic electrode and the pair made up of the right web electrode and the right seismic electrode together form a differential capacitor. During the evaluation, a left-side capacitance between the left web electrode and the left seismic electrode is subtracted from a right-side capacitance between the right web electrode and the right seismic electrode. This difference is zero without an acceleration since the distance of adjacent tine pairs 7, 8 is the same on both sides of central web 1. If, due to an acceleration, a tine 7 of the left web electrode moves away from an adjacent tine 8 of the left seismic electrode, a tine 7 of the right web electrode simultaneously approaches an adjacent tine 8 of the right seismic electrode, whereby the capacitance on the left side decreases while the capacitance on the right side increases. Their difference is particularly sensitive to an acceleration.

Figure 2:
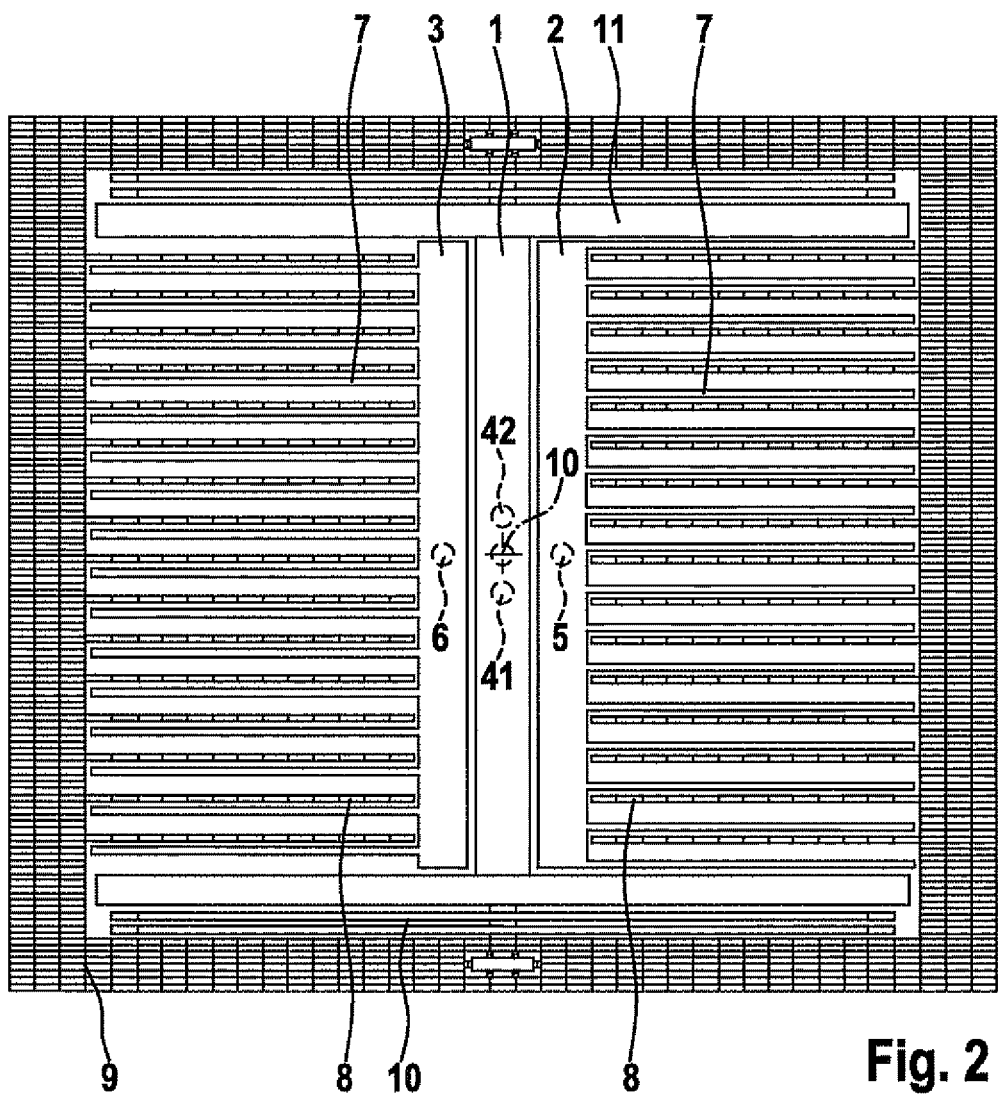
FIG. 2 shows a first specific embodiment of an acceleration sensor according to the present invention having a suspension close to the center.

FIG. 2 shows a first specific embodiment of an acceleration sensor according to the present invention having a suspension close to the center. In contrast to the above-described related art, central web 1 is anchored on the subjacent substrate with the aid of two anchors 41 and 42. Center of gravity 10 (frequently also referred to as surface center of gravity or the central axis) of seismic mass 9, or its projection in top view, runs through web 1. The two anchors 41 and 42 are not situated at center of gravity 10, but a small distance aside. In this specific embodiment, center of gravity 10 is located between anchors 41 and 42.

Another exemplary embodiment is conceivable in which, in contrast to FIG. 2, only one of anchors 41 or 42 is provided to anchor web 1 on the substrate. The one anchor 41 or 42 is also situated adjacent to center of gravity 10. Therefore, center of gravity 10 does thus not run through anchor 41 or 42 of web 1.

Figure 3:
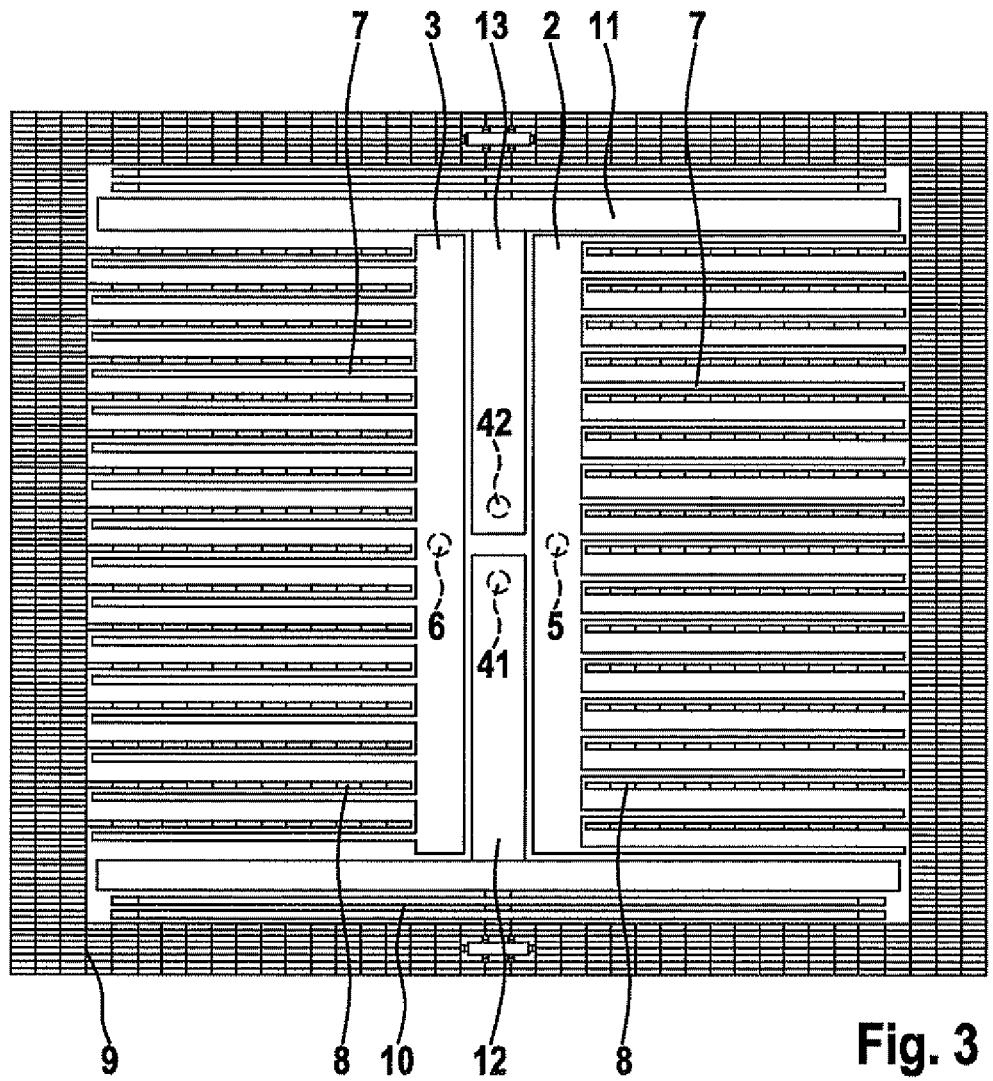
FIG. 3 shows a second specific embodiment of an acceleration sensor according to the present invention having a suspension close to the center.

FIG. 3 shows a second specific embodiment of an acceleration sensor according to the present invention having a suspension close to the center. In contrast to the described exemplary embodiment according to FIG. 2, central web 1 is divided into two parts in such a way that two webs 12 and 13 are provided which are anchored on the substrate using one anchor 41 and 42 each. Center of gravity 10 of seismic mass 9 does not run through any of webs 12, 13. Anchors 41 and 42 are not situated at center of gravity 10, but at a small distance aside. In this exemplary embodiment, center of gravity 10 is also located between anchors 41 and 42.

Figure 4:
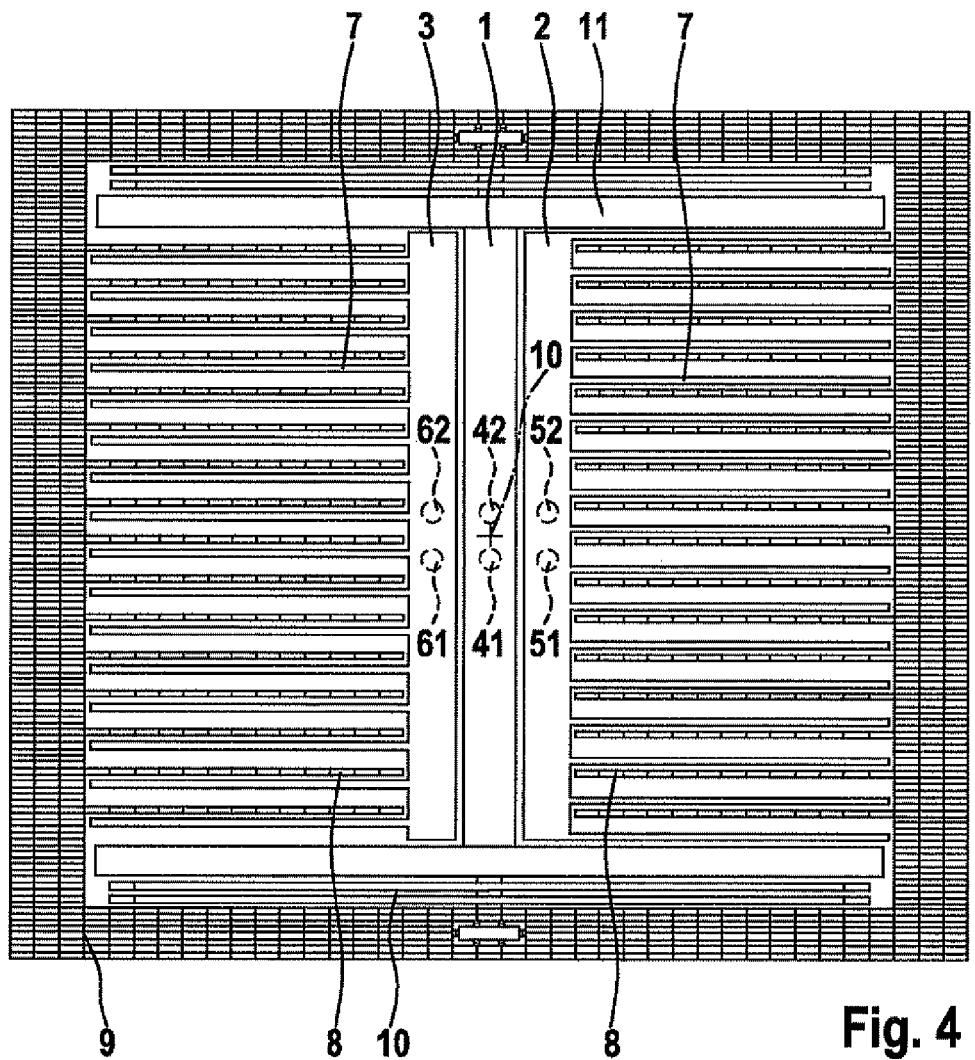
FIG. 4 shows a third specific embodiment of an acceleration sensor according to the present invention having a suspension close to the center.

FIG. 4 shows a third specific embodiment of an acceleration sensor according to the present invention having a suspension close to the center. In contrast to the described exemplary embodiment according to FIG. 2, it is provided that webs 2 and 3 of the left and the right web electrode are also anchored on the substrate using multiple anchors 51 and 52 and 61 and 62.

In another specific embodiment it is provided that the left and the right web electrode do not have a shared web 2, 3, but rather tines 7 are anchored on the substrate individually or in small groups.

What is claimed is:

1. An acceleration sensor having a substrate, at least one central web (1, 12, 13), one right web (2), and one left web (3), and a seismic mass (9), the right web (2) and the left web (3) running parallel to the central web (1, 12, 13), the central web (1, 12, 13) and the seismic mass (9) being situated over a plane of the substrate, the seismic mass (9) being situated on at least two sides of the central web (1, 12, 13), the seismic mass (9) being elastically suspended on the central web (1, 12, 13), the central web (1, 12, 13) being anchored on the substrate with the aid of at least one anchor (41, 42), wherein each of the at least one anchor (41, 42) is situated outside the center of gravity (10) of the seismic mass (9).

2. The acceleration sensor as recited in claim 1, wherein at least two anchors (41 and 42) are provided.

3. The acceleration sensor as recited in claim 2, wherein the center of gravity (10) is situated between the two anchors (41 and 42).

4. The acceleration sensor as recited in claim 1, wherein the seismic mass (9) surrounds the central web (1, 12, 13) in the shape of a ring.

5. The acceleration sensor as recited in claim 1, wherein the central web includes at least two central webs (12 and 13) provided on which the seismic mass (9) is elastically suspended.

6. The acceleration sensor as recited in claim 1, wherein two anchors are provided.

7. The acceleration sensor as recited in claim 6, wherein the center of gravity is situated between the two anchors.

8. The acceleration sensor as recited in claim 1, wherein only one anchor is provided and wherein the anchor is situated adjacent to the center of gravity such that the center of gravity does not run through the anchor.

* * * * *

UNITED STATES PATENT AND TRADEMARK OFFICE
CERTIFICATE OF CORRECTION

PATENT NO.      : 8,516,890 B2
APPLICATION NO. : 12/680715
DATED           : August 27, 2013
INVENTOR(S)     : Dirk Rehle Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 356 days.

Signed and Sealed this
Fifteenth Day of September, 2015

Michelle K. Lee
*Director of the United States Patent and Trademark Office*